(12) United States Patent
Michalski

(10) Patent No.: US 9,523,356 B2
(45) Date of Patent: Dec. 20, 2016

(54) TORQUE SUPPORT

(75) Inventor: Michael Michalski, Witten (DE)

(73) Assignee: ZF Friedrichshafen AG, Friedrichshafen (DE)

(*) Notice: Subject to any disclaimer, the term of this patent is extended or adjusted under 35 U.S.C. 154(b) by 115 days.

(21) Appl. No.: 13/223,283

(22) Filed: Aug. 31, 2011

(65) Prior Publication Data
US 2012/0056071 A1 Mar. 8, 2012

(30) Foreign Application Priority Data

Sep. 3, 2010 (DE) .................. 10 2010 044 297

(51) Int. Cl.
*F16M 13/00* (2006.01)
*F16F 15/00* (2006.01)
*F01D 25/28* (2006.01)
*F16M 1/00* (2006.01)
*F16M 3/00* (2006.01)
*F16M 5/00* (2006.01)
*F16M 7/00* (2006.01)
*F16M 9/00* (2006.01)
*F16M 11/00* (2006.01)
*F16F 15/08* (2006.01)
*H01M 2/10* (2006.01)
*F03D 1/00* (2006.01)
(Continued)

(52) U.S. Cl.
CPC .............. *F03D 80/88* (2016.05); *F01D 25/28* (2013.01); *F16F 15/00* (2013.01); *B60K 5/1216* (2013.01); *F01D 25/24* (2013.01); *F03D 1/008* (2013.01); *F03D 13/35* (2016.05); *F16F 15/08* (2013.01); *H01M 2/10* (2013.01); Y02E 10/722 (2013.01)

(58) Field of Classification Search
CPC .......... B25H 1/0007; B23P 6/002; F02C 7/20; F16C 17/02; F16C 35/02; F01D 25/28; F01D 25/24; F01D 25/243; F01D 25/162; F01D 25/164; F01D 15/28; F01D 15/24; F16M 11/10; F16M 1/04; F16M 5/00; F16M 2200/08; F16M 13/00; F16F 15/02; F16F 15/1297; F16F 15/08; F16H 57/021; F23R 3/60; F03D 11/0075; F03D 1/008; F03D 13/35; F02D 11/00; H01M 2/10; B60K 5/1216
USPC ....... 248/638, 637, 646, 566, 542, 560, 634, 248/667, 605, 664, 666; 415/119; 384/428; 310/51
See application file for complete search history.

(56) References Cited

U.S. PATENT DOCUMENTS 2,128,805 A * 8/1938 Doran ............... F16M 5/00
248/637
2,475,109 A * 7/1949 Pendleton ............ F28F 9/007
220/567

(Continued)

OTHER PUBLICATIONS

Bosch Rexroth, AG, Drive & Control-Technologie für Windenergieanlagen, RD 76110, Aug. 2010, German and English language document, 32 pages, Germany.

Primary Examiner — Brian Mattei
Assistant Examiner — Taylor Morris
(74) Attorney, Agent, or Firm — Maginot, Moore & Beck LLP

(57) ABSTRACT

A torque support is disclosed for transmitting a supporting force of a gear mechanism of a wind power plant to a carrying mechanism. The torque support has a connection piece, the abutment surfaces of which, which are subjected to the supporting force, are arranged in a manner substantially perpendicular to the supporting force.

14 Claims, 3 Drawing Sheets

(51) Int. Cl.
    *F01D 25/24*    (2006.01)
    *B60K 5/12*     (2006.01)

(56)              References Cited

U.S. PATENT DOCUMENTS

| 2,632,997 | A  | * | 3/1953  | Howard ................... F01D 5/06 |
|-----------|----|---|---------|--------------------------------------|
|           |    |   |         | 248/678                              |
| 4,329,117 | A  | * | 5/1982  | Doman ..................... 416/170 R |
| 5,810,558 | A  | * | 9/1998  | Streeter ..................... 415/213.1 |
| 6,129,327 | A  | * | 10/2000 | Dubois ........................ 248/634 |
| 6,712,516 | B1 | * | 3/2004  | Giberson ...................... 384/215 |
| 7,083,165 | B2 | * | 8/2006  | Palinkas ....................... 267/294 |
| 7,237,958 | B2 | * | 7/2007  | Giberson ...................... 384/428 |
| 7,546,742 | B2 | * | 6/2009  | Wakeman et al. .............. 60/796 |
| 2008/0135352 | A1 | * | 6/2008 | Bell ............................ 188/73.39 |
| 2009/0072116 | A1 | * | 3/2009 | Fielding ....................... 248/638 |

\* cited by examiner

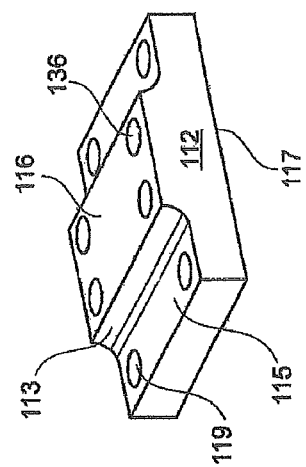
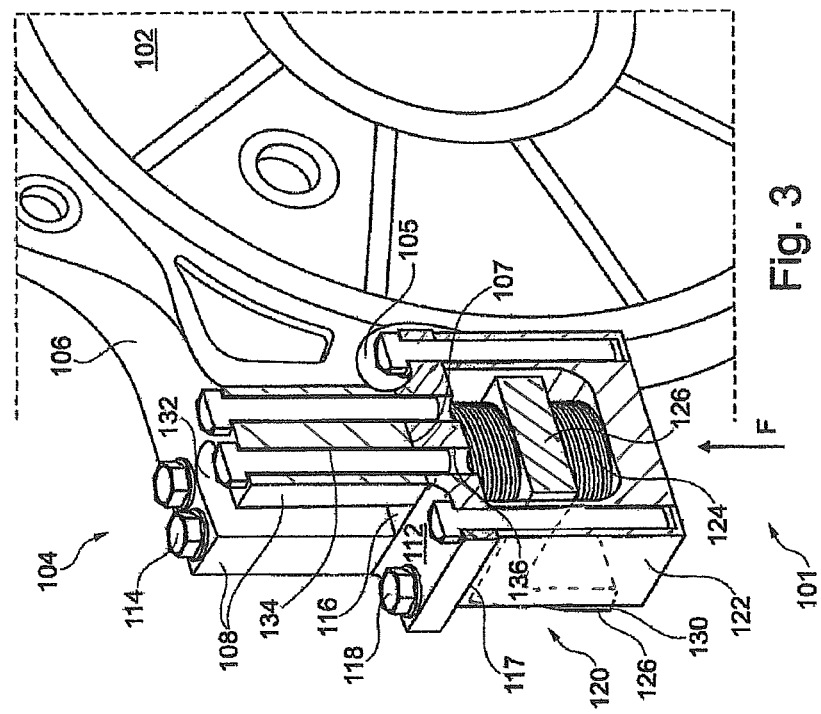

TORQUE SUPPORT

This application claims priority under 35 U.S.C. §119 to German patent application no. DE 10 2010 044 297.6, filed Sep. 3, 2010 in Germany, the disclosure of which is incorporated herein by reference in its entirety.

BACKGROUND

The disclosure relates to a torque support for a gear mechanism of a wind power plant.

Wind power plants having a horizontal axis of rotation of a rotor around which the wind passes have, at the top of a tower, a power house, also frequently called a gondola. Arranged therein is a generator, via which kinetic rotation energy of the rotor can be converted into electrical power. The rotor is connected via its hub to a shaft, which is coupled to a gear mechanism. The gear mechanism transmits the rotational movement and the torque of the rotor to the generator. Within the gondola, the assemblies are connected firmly to a carrying means, what is known as the machine carrier, which is usually formed by a baseplate. During operation, reaction forces, bearing forces and supporting forces of the assemblies mounted on the machine carrier are transmitted to said machine carrier.

During operation, a reaction torque is produced at the gear mechanism of the wind power plant. Via a torque support of the gear mechanism, supporting forces that result from the torque are transmitted to the machine carrier.

An example of a conventional torque support is known from the applicant's REDULUS GPV main gear mechanism for wind power plants (data sheet RD76110 at www.boschrexroth.com). A variant of this torque support is configured as an approximately diamond-shaped torque plate, which is fitted at the end side of the gear mechanism housing and through which the shaft passes. The torque support is also called a bearing housing, since a bearing of a gear mechanism input shaft is supported on it. The two acute-angled end portions of the approximately diamond-shaped torque plate extend in this case radially and horizontally away from the gear mechanism. Formed in the torque plate in the respective radially outer region of the end portions are axially and horizontally configured through-holes through which bolts pass. These bolts are finally firmly clamped in a device mounted on the machine carrier in order to transmit to the latter the supporting forces resulting from the torque.

Since this device is configured in a different manner depending on the manufacturer of the wind power plant and the bolts of the torque support are clamped directly therein, each of these conventional torque supports has to be adapted individually to the given device. However, in this case, according to the prior art, a strength-optimized design of the torque support often has to be dispensed with in favor of a standardized but oversized design. A disadvantage with such torque supports is that they are heavier and more voluminous than strength-optimized torque supports.

What is more, precisely because of the given geometry of the device, dimensioning the torque support can also prove to be difficult or even almost impossible.

In an alternative variant of the conventional torque support, the latter is formed not as a diamond-shaped torque plate but as an approximately cylindrical torque plate having two shoulders at the top. Each shoulder has a laterally formed flange, on which a respective vertical connection piece is fixed via in each case two spacer blocks and a multiplicity of screw connections that run horizontally. The spacer blocks and the connection pieces represent in principle (lever) arms, via which the supporting forces are transmitted to the machine carrier.

Although this multi-part arm, having its connection piece which can be adapted to the individual geometric particular features of the manufacturer-specific machine carrier, simplifies a strength- and weight-optimized design of the torque support, in particular of the torque plate, it proves to be disadvantageous that a large number of individual parts are used to form the arm. In addition, if it is put together wrongly, for example in the case of an insufficient tightening torque of the screws, the screw connections can be subjected to bending or shear stress, and in the most unfavorable case this can result in failure of the torque support.

By contrast, it is the object of the disclosure to provide a torque support of simpler construction.

This object is achieved by a torque support having the features set forth below.

Further advantageous configurations of the disclosure are described below.

SUMMARY

The torque support according to the disclosure for a gear mechanism of a wind power plant has, in order to transmit a supporting force that results from a torque of the gear mechanism, at least one arm which extends in a substantially radial manner with respect to the axis of rotation of the torque and to which a connection piece is fixed. An abutment surface of the connection piece butts in this case against an abutment surface of the arm. According to the disclosure, the abutment surfaces are arranged in a substantially perpendicular manner with respect to the supporting force. Thus, the fixture of the connection piece to the arm is subjected substantially to tensile or compressive forces and, compared with the prior art, scarcely to shear forces or bending forces. In this way, it is possible to form the fixture in a comparatively simple manner.

Since the connection piece can be adapted easily to individual installation conditions of a wind power plant of any manufacturer, it is possible, independently of the subsequent installation conditions, to define geometric boundary conditions for a strength-optimized design of the torque support. A geometric gap which subsequently arises between the arm of the torque support and its mounting site in or on the wind power plant can then be bridged easily via the individual connection piece.

It is also advantageous that the connection piece makes it easier to mount the gear mechanism in the wind power plant, since first of all the connection piece can be fixed to the wind power plant and then the gear mechanism and its torque support can be fixed to the mounted connection piece via readily accessible fixing elements. The connection surfaces of the arm and of the connection piece are in this case formed in a preferably planar manner, but can for example also have matching convex and concave, cylindrical or spherical forms, in order to be able to transmit by a form fit any shear forces that occur. Preferably, an abutment surface of the connection piece on the wind power plant is also arranged in a substantially perpendicular manner with respect to the supporting force.

In a preferred development of the torque support, the latter is formed integrally together with its arm. In this way, the intermediate blocks necessary according to the prior art for forming the arm are dispensed with, and this advantageously reduces the number of parts required for forming the torque support and further simplifies the torque support.

In a preferred development, the connection piece is configured as a plate.

It is preferred for the abutment surface, butting against the arm, of the connection piece or of the plate to be raised with respect to the rest of the top side of the connection piece or of the plate.

Preferably, the connection piece is fixed to the arm via a force-fitting connection. As an alternative thereto, a cohesive connection, for example by welding or adhesive bonding, is also possible. A further possibility is a frictional connection.

In a preferred variant, the force-fitting connection is formed via at least one screw connection, which has in each case a through-hole in the arm and a threaded hole formed in the abutment surface of the connection piece, wherein the through-hole and the threaded hole are formed so as to be aligned with one another and approximately parallel to the supporting force. It is advantageous in this case that the connection via a screw is cost-effective and can be mounted and released again easily.

In a preferred development, the force-fitting connection is formed via a multiplicity of screw connections.

It is preferred in this case if the arm is bifurcated in a region between the multiplicity of through-holes of the screw connections via a recess formed radially with respect to the axis of rotation of the torque (M) and approximately parallel to the through-holes.

In order to transmit the supporting force to a carrying means or to a machine carrier of the wind power plant, the connection piece is fixed to the carrying means or to the machine carrier either directly or via an intermediate piece.

In a variant in which the connection piece is fixed directly to the carrying means or to the machine carrier, an abutment surface of the connection piece is arranged on the carrying means or on the machine carrier preferably in a manner substantially perpendicular to the supporting force. The same advantages apply here as have already been described for the abutment surface of the connection piece: since the abutment surface, which is formed by the connection piece together with the carrying means or with the machine carrier, is arranged perpendicularly to the transmitted supporting force, the fixture of the connection piece to the carrying means or to the machine carrier is subjected substantially to tensile or compressive forces and is only subjected to shear forces or bending forces to a comparatively small extent. It is thus possible to form the fixture in a simple manner.

In an alternative variant, in which the connection piece is fixed to the carrying means or to the machine carrier via the intermediate piece, an abutment surface of the connection piece is arranged on the intermediate piece, or an abutment surface of the intermediate piece is arranged on the carrying means or on the machine carrier, preferably in a manner substantially perpendicular to the supporting force. Here again, the same advantages apply as have already been described for the abutment surface of the connection piece: since the abutment surface, which is formed by the connection piece together with the intermediate piece or is formed by the intermediate piece together with the carrying means or with the machine carrier, is arranged perpendicularly to the transmitted supporting force, the fixture of the connection piece to the carrying means or to the machine carrier is subjected substantially to tensile or compressive forces and is only subjected to shear forces or bending forces to a comparatively small extent. It is thus possible to form the fixture in a simple manner.

In a preferred further development of the torque support, the intermediate piece has a damping unit, which is adapted to the supporting force to be transmitted. By way of the damping unit, torque peaks or supporting-force peaks can be transmitted to the carrying means or to the machine carrier of the wind power plant in a damped manner. The damping unit can have for example simple damping elements made of an elastomer, polymer or metal or be formed as a spring-damper unit.

In a preferred embodiment of the torque support, in particular when the supporting force is transmitted vertically to the carrying means or to the machine carrier of the wind power plant, the abutment surfaces are arranged horizontally.

In a preferred further development of the torque support, the latter has two arms, which are formed in an approximately symmetrical manner to a plane in which the axis of rotation of the torque is located. In this way, compared with only one arm, the supporting force to be transmitted can be reduced, approximately halved, for each arm. Since the arms are symmetrical, this makes it easier in particular to produce a mold for the arms or the torque support.

BRIEF DESCRIPTION OF THE DRAWINGS

The prior art and a preferred exemplary embodiment of the disclosure are explained in more detail in the following text on the basis of four drawings, in which:

FIG. 3 shows a perspective sectional view of the exemplary embodiment according to the disclosure of the torque support according to FIG. 2; and FIG. 4 shows a perspective view of a connection piece of the exemplary embodiment according to the disclosure of the torque support according to FIGS. 2 and 3.

DETAILED DESCRIPTION

Figure 1:
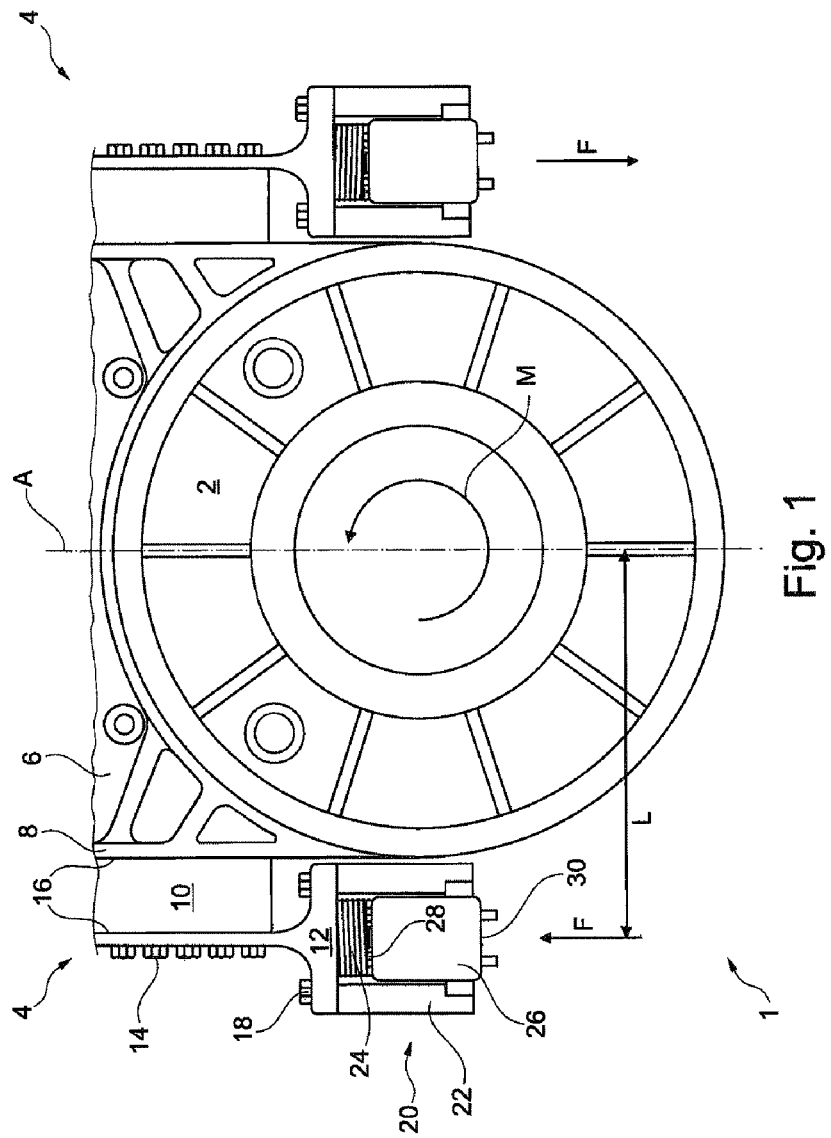
FIG. 1 shows, in order to illustrate the prior art, a plan view of a conventional torque support for a gear mechanism in a wind power plant.

FIG. 1 shows, in order to illustrate the prior art, a plan view of a conventional torque support for a gear mechanism in a wind power plant.

In FIG. 1, there can be seen a torque support 1 which is formed symmetrically with respect to the axis A and consists substantially of a torque plate 2 and two arms 4. On account of the symmetry, the description is given exclusively on the basis of that region of the torque support 1 which is illustrated to the left of the axis of symmetry A in FIG. 1. The torque plate 2 has an approximately rectangular shoulder 6 in its upper region on the left in FIG. 1. Formed on the shoulder 6 is a vertical flange 8, to which a T-shaped connection piece 12 is fixed, via two spacer blocks 10 (one of which is hidden), by way of a multiplicity of screws 14. Formed between the connection piece 12 and the spacer block 10 and between the spacer block 10 and the flange 8 are vertical abutment surfaces 16. A multi-part intermediate piece 20 is fixed via further screws 18 to a transverse portion, formed horizontally in FIG. 1, of the connection piece 12. The intermediate piece 20 has a U-shaped profile 22, damping elements 24, and a further U-shaped profile 26. The intermediate piece 20 can be connected to a machine carrier (not shown) of the wind power plant via screws 28. For an exemplary direction, illustrated in FIG. 1, of the torque M, under the assumption of symmetry a tensile force results on the right-hand arm 4 and a compressive force on the left-hand arm 4.

A critical factor with the conventional torque support 1 having abutment surfaces 16 arranged approximately parallel to the supporting force F is that the screws 14 are subjected to a bending force and in unfavorable cases to a shear force. A further unfavorable feature of the conventional torque support 1 shown is that it has a large number of individual parts. It is from here that the solution approach of a torque support 101 (cf. FIG. 2 et seq.) according to the disclosure proceeds.

Figure 2:
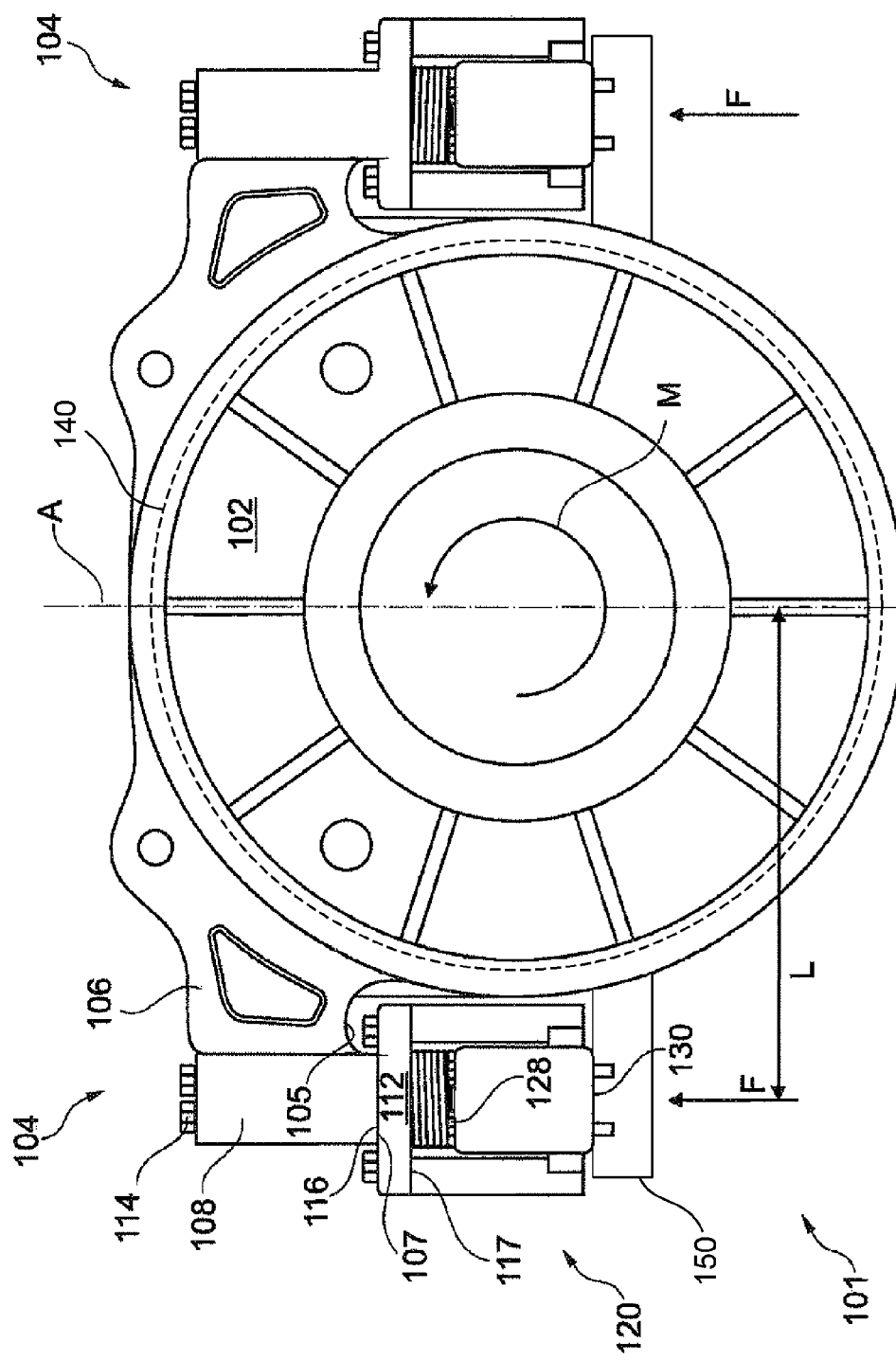
FIG. 2 shows a plan view of an exemplary embodiment according to the disclosure of a torque support for a gear mechanism in a wind power plant.

FIG. 2 shows a plan view of an exemplary embodiment according to the disclosure of the torque support 101 for a gear mechanism in a wind power plant. Said torque support 101 is designed for supporting torques in the order of magnitude of 2900 kNm. On account of the symmetry with respect to the axis A, the description of FIG. 2 is limited to the left-hand part of the torque support 101.

A torque plate 102 of the torque support 101 is fixed (not shown) to the gear mechanism 140 (illustrated schematically) or to the housing of the gear mechanism via a multiplicity of axially arranged screws. When the wind power plant is in operation, a rotational movement of a rotor, said rotational movement being transmitted via the hub of said rotor to a driveshaft and via the latter to the gear mechanism 140, results in a reaction torque or torque M. This reaction torque M has to be supported at the machine carrier 150 (illustrated schematically) of the wind power plant via the torque support 101. As a rule, the machine carrier 150 is a baseplate, which is arranged in a gondola of the wind power plant. The supporting forces F result from the torque M.

A first difference from the conventional torque support 1 according to FIG. 1 is that an arm 104, which has a shoulder 106 and flanges 108, is formed integrally with the torque plate 102, in contrast to the arm 4 (cf. FIG. 1). The torque plate 102 is cast in this case from nodular cast iron EN-GJS 400-18. The arm 104 is designed in a strength- and weight-optimized manner. Its shoulder 106 conforms substantially close to a cylindrical outer contour of the torque plate 102. Since the arm 104 is formed integrally with the torque plate 102, the conventional spacer blocks 10 (cf. FIG. 1) are also dispensed with.

A further essential difference of the torque support 101 according to the disclosure from the conventional torque support 1 (cf. FIG. 1) is a geometrically simpler formation of the connection piece 112. The latter is in the form of a plate and is similar to the horizontal transverse portion of the connection piece 12 according to FIG. 1. In this way, it is possible for an abutment surface 116 between the connection piece 112 and the arm 104 to be arranged substantially perpendicular to the supporting force F rather than parallel to the supporting force F. As a consequence, screws 114 of the connection piece 112 are subjected to compressive or tensile forces, depending on the direction of rotation of the gear mechanism shaft when the wind power plant is in operation. In order to absorb the supporting force F, the screws 114 are designed to have the size M42. Bending or shear forces are minimized or not present in the shown design according to the disclosure of the connection piece 112. A description of an intermediate piece 120 fixed to the connection piece 112 is given with regard to FIG. 3.

FIG. 3 shows a perspective sectional view of the exemplary embodiment according to the disclosure of the torque support 101 according to FIG. 2. The arm 104, formed integrally with the torque plate 102, together with its shoulder 106 can be seen on the left-hand side in FIG. 3. Formed at the end of the shoulder 106 are the two flanges 108. The arm 104 is formed to be as short as possible in the radial direction. Between the flanges 108 and the torque plate 102, a rounded transition zone 105 is additionally formed on an underside of the shoulder 106. In the comparatively small-scale transition zone 105, the greatest stresses occur in the material while the wind power plant is in operation. When the strength of the torque support is optimized with the aid of FEM methods, said transition zone 105 represents a neuralgic region. The two flanges 108 are separated from one another by a recess 132 which is formed approximately vertically in FIG. 3. Formed in the two flanges 108 are in each case two through-holes 134 for receiving screws 114. At an abutment surface 107 of the flanges 108, the connection piece 112 is brought into abutment with the flange 108 by way of its abutment surface 116. The connection piece 112 has, for each through-hole 134 in the flanges 108, a threaded hole 136, into which the screws 114 are screwed with a suitable tightening torque. The abutment surface 116 is formed in a slightly raised manner with respect to the rest of the top side of the connection piece 112.

The intermediate piece 120 is fixed to the connection piece 112 via screws 118. In this case, the intermediate piece 120 is formed as a damping unit. The latter has three components: a first U-shaped profile 122, which is fixed to the connection piece 112 in a force-fitting manner via screws 118, a multiplicity of damping elements 124, which are arranged in a sandwich-like manner between the connection piece 112 and that limb of the U-shaped profile 122 which is formed in a horizontal manner in FIG. 3, and a second U-shaped profile 126, which is arranged by way of its limb, which is formed approximately horizontally in FIG. 3, between two central layers of the damping elements 124. This second U-shaped profile 126 can be fixed to the machine carrier of the wind power plant via screws 128 (cf. FIG. 2). A flow of force follows the following path in the case of a torque M acting during operation: the torque plate 102 transmits the torque M via the arm 104 or the shoulder 106 thereof, the flanges 108, and the connection piece 112 to the intermediate piece 120. The torque M results in the supporting force F, which is introduced via the second U-shaped profile 126 of the intermediate piece 120 into the machine carrier 150 of the wind power plant. On account of the abutment surfaces 107, 116, 117, 130, which are arranged perpendicularly to the supporting force F, substantially normal forces are transmitted between the arm 104, the connection piece 112, the intermediate piece 120 and the machine carrier 150. The same transmission path of the supporting force F takes place on the other side of the torque support 101.

The use of the connection piece 112 and of the intermediate piece 120 makes it possible to adapt the torque support 101 in a precise and respectively individual manner to a respective individual machine carrier of the wind power plant.

Thus, a manufacturer of the gear mechanism or a manufacturer of the torque support 101 can design these in an optimal manner for a torque or strength range to be expected, independently of a machine carrier 150 on which the gear mechanism 140 is intended to be mounted in the future. A remaining distance between the torque support 101 and the individual machine carrier which is dependent on the manufacturer of the wind power plant can be bridged via the individually adaptable connection piece 112 and optionally via the additional intermediate piece 120.

FIG. 4 shows a perspective view of the connection piece 112 of the exemplary embodiment according to the disclosure of the torque support 101 according to FIGS. 2 and 3. In this case, the connection piece 112 has an approximately plate-like form. It has an upper abutment surface 116 and a lower abutment surface 117. The upper abutment surface 116 can be brought into abutment, according to FIG. 3, with the abutment surface 107 of the associated flanges 108 (cf. FIG. 2). The screws 114, via which the connection plate 112 is fixed to the arm 104 (cf. FIG. 3), can be screwed into the four threaded holes 136. The abutment surface 116 is in this case formed in a slightly raised manner with respect to the rest of the top side 115 of the connection piece 112. Formed between the abutment surface 116 and the top side 115 is a rounding 113, in order to minimize a notch effect at this point in the transmission of forces from the arm 104 to the intermediate piece 120 or to the machine carrier (not shown) of the wave power plant. Other shapes are possible as an alternative to the plate-like formation of the connection piece 112. The rounding 113 can be replaced for example by an inclined surface. Counterbores would then have to be provided on through-holes 119 for the screws 118 according to FIG. 3. Furthermore, the connection piece 112 can be formed such that the number of the holes 119 and 136 is higher than depicted.

In the exemplary embodiment, shown in FIG. 4, of the connection plate 112, the abutment surfaces 116 and 117 are formed in a planar manner. As an alternative to this planar formation, convex or concave forms of the abutment surfaces 116, 117 are also conceivable. It is likewise possible to form the two abutment surfaces 116, 117 to be spherical. In the manner mentioned, when the wind power plant is in operation, transverse forces and associated flexural loading of the screws 114, 118 and 128 (cf. FIG. 2) via the form fit formed in this way between the connection piece 112 and its connection partners, the flanges 108 and the intermediate piece 120 or the machine carrier (not illustrated) of the wave power plant, can be compensated.

Disclosed is a torque support for transmitting a supporting force of a gear mechanism of a wind power plant to a carrying means. The torque support has in this case a connection piece, the abutment surfaces of which, which are subjected to the supporting force, are arranged in a manner substantially perpendicular to the supporting force.

LIST OF REFERENCE NUMERALS

1; 101 Torque support
2; 102 Torque plate
4; 104 Arm
105 Transition zone
6; 106 Shoulder
107 Abutment surface
8; 108 Flange
10 Spacer block
12; 112 Connection piece
113 Rounding
14; 114 Screw
115 Top side
16; 116 Abutment surface
117 Abutment surface
18; 118 Screw
119 Through-hole
20; 120 Intermediate piece
22; 122 U-shaped profile
24; 124 Damping element
26; 126 U-shaped profile
28; 128 Screw
30; 130 Abutment surface
132 Recess
134 Through-holes
136 Threaded holes

What is claimed is:

1. A torque support configured to support a gear mechanism of a wind power plant and transmit a supporting force to a carrying mechanism of the wind power plant in response to a torque of the gear mechanism, comprising:
   a first arm formed integrally with a torque plate and extending in a substantially radial manner with respect to the axis of rotation of the torque, the first arm including a first abutment surface that is substantially planar and is oriented in a first generally horizontal plane;
   a first connection piece fixed to the first arm and including a second abutment surface that is substantially planar and abuts against the first abutment surface at the first plane; and
   a first damping unit arranged between the first connection piece and the carrying mechanism, the first damping unit being configured to damp torque peaks or supporting force peaks between the first connection piece and the carrying mechanism,
   wherein the first connection piece is generally plate shaped and includes a raised portion, which includes the second abutment surface, and two flange portions extending outwardly from the raised portion, the two flange portions including top side surfaces facing in a direction of the first abutment surface and arranged in a second generally horizontal plane that is spaced apart from the first generally horizontal plane,
   wherein the first connection piece includes a bottom side surface arranged in a third generally horizontal plane that is spaced apart from the first and second planes, and wherein the first connection piece includes a length in the first pane spanning the raised portion and the two flange portions, a width perpendicular to the length in the first plane spanning the raised portion or either of one of the two flange portions, and a height measured perpendicularly from the first plane to the third plane, the height being less than the length and the width.

2. The torque support according to claim 1, wherein the torque plate is generally circular and is configured to attach to the gear mechanism of the wind power plant.

3. The torque support according to claim 2, further comprising a second arm, a second connection piece, and a second damper unit, wherein:
   the second arm, the second connection piece, and the second damper unit, respectively, are essentially identical to the first arm, the first connection piece, and the first damper unit, respectively, and the second arm is formed integrally with the torque plate, and
   the second arm, the second connection piece, and the second damper unit are arranged symmetrical to the first arm, the first connection piece, and the first damper unit, respectively, about a vertical plane extending centrally through the torque plate.

4. The torque support according to claim 1, wherein the first connection piece is fixed to the first arm via a force-fitting connection.

5. The torque support according to claim 4, wherein
   the force-fitting connection is a screw connection, which includes a through-hole defined in the arm and a threaded hole defined in the second abutment surface of the first connection piece, and the through-hole and the threaded hole are formed so as to be aligned with one another and approximately parallel to the supporting force.

6. The torque support according to claim 5, wherein the torque support includes a multiplicity of screw connections.

7. The torque support according to claim 1, wherein the first connection piece is fixed directly to an intermediate piece that is connected to the carrying mechanism.

8. The torque support according to claim 7, wherein the bottom side surface of the first connection piece forms a third abutment surface, the third abutment surface abutting against the intermediate piece in the third plane, and the second plane is arranged between the first and third planes.

9. The torque support according to claim 8, wherein the intermediate piece includes a fourth abutment surface abutting against the carrying mechanism in a fourth plane that is substantially parallel to the first plane.

10. The torque support according to claim 7, wherein the intermediate piece includes the first damping unit.

11. The torque support according to claim 1, wherein the supporting force is directed substantially in an upward vertical direction.

12. A torque support configured to support a gear mechanism of a wind power plant and transmit a supporting force to a carrying mechanism of the wind power plant in response to a torque of the gear mechanism, comprising:
a first arm formed integrally with a torque plate and extending in a substantially radial manner with respect to the axis of rotation of the torque, the first arm including a first abutment surface that is substantially planar and is oriented in a first generally horizontal plane;
a first connection piece fixed to the first arm and including a second abutment surface that is substantially planar and abuts against the first abutment surface at the first plane; and
a first damping unit arranged between the first connection piece and the carrying mechanism, the first damping unit being configured to damp torque peaks or supporting force peaks between the first connection piece and the carrying mechanism, wherein:
the first connection piece is generally plate shaped and includes a raised portion, which includes the second abutment surface, and two flange portions extending outwardly from the raised portion, the two flange portions including top side surfaces facing in a direction of the first abutment surface and arranged in a second generally horizontal plane that is spaced apart from the first generally horizontal plane,
the first connection piece is fixed to the first arm via a force-fitting connection,
the force-fitting connection is a screw connection, which includes a through-hole defined in the arm and a threaded hole defined in the second abutment surface of the first connection piece,
the through-hole and the threaded hole are formed so as to be aligned with one another and approximately parallel to the supporting force, and
the first arm is bifurcated between the through-holes of the screw connections to define a recess extending entirely through the first arm in a direction approximately parallel to the through-hole.

13. The torque support according to claim 12, wherein: the first connection piece includes a bottom side surface arranged in a third generally horizontal plane that is spaced apart from the first and second planes, and the first connection piece includes a length in the first plane spanning the raised portion and the two flange portions, a width perpendicular to the length in the first plane spanning the raised portion or either of one of the two flange portions, and a height measured perpendicularly from the first plane to the third plane, the height being less than the length and the width.

14. A torque support configured to support a gear mechanism of a wind power plant and transmit a supporting force in response to a torque of the gear mechanism, comprising:
an arm which extends in a substantially radial manner with respect to the axis of rotation of the torque and includes a first abutment surface;
a connection piece fixed to the arm and including a second abutment surface abutting against the first abutment surface of the arm and a third abutment surface opposite the second abutment surface; and
an intermediate piece including (i) a first U-shaped profile defining a first central opening and having a first base portion and limbs extending from the first base portion to abut against the third abutment surface of the connection piece, (ii) a second U-shaped profile having a second base portion extending through the central opening of the first U-shaped profile, (iii) a first damping element sandwiched between the second base portion of the second U-shaped profile and the third abutment surface, and (iv) a second damping element sandwiched between the first base portion of the first U-shaped profile and the second base portion of the second U-shaped profile,
wherein the first and second abutment surfaces are substantially planar and are oriented in a first generally horizontal plane that is perpendicular with respect to the supporting force.

* * * * *